(12) United States Patent
Doane

(10) Patent No.: US 10,225,112 B1
(45) Date of Patent: Mar. 5, 2019

(54) ADAPTIVE DIGITAL CANCELLATION USING PROBE WAVEFORMS

(71) Applicant: Massachusetts Institute of Technology, Cambridge, MA (US)

(72) Inventor: Jonathan P. Doane, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/850,650

(22) Filed: Dec. 21, 2017

(51) Int. Cl.
*H04L 25/03* (2006.01)
*H04L 25/02* (2006.01)
*H04B 1/7107* (2011.01)
*H04B 1/04* (2006.01)
*H04B 7/08* (2006.01)

(52) U.S. Cl.
CPC ..... *H04L 25/03343* (2013.01); *H04B 1/0475* (2013.01); *H04B 1/7107* (2013.01); *H04L 25/0202* (2013.01); *H04B 7/0842* (2013.01)

(58) Field of Classification Search
CPC .......... H04L 25/03343; H04L 25/0202; H04B 1/0475; H04B 1/71007; H04B 7/0842
USPC ....................................................... 375/296
See application file for complete search history.

(56) References Cited

U.S. PATENT DOCUMENTS

| | | | | |
|---|---|---|---|---|
| 2003/0099208 A1* | 5/2003 | Graziano | ............ | H04L 1/0001 370/286 |
| 2007/0285326 A1* | 12/2007 | McKinzie | ............ | H01Q 9/0407 343/746 |
| 2010/0020981 A1* | 1/2010 | Elmedyb | ............ | H04R 25/353 381/71.11 |
| 2013/0070936 A1* | 3/2013 | Jensen | ............ | H04R 3/005 381/71.11 |

* cited by examiner

*Primary Examiner* — Michael R Neff
(74) *Attorney, Agent, or Firm* — Daly, Crowley, Mofford & Durkee, LLP

(57) ABSTRACT

A method and apparatus for achieving simultaneous transmit and receive operation with digital cancelling based upon probe waveforms is described. Digital cancelling based upon probe waveforms enables adjacent transmitting and receiving channels to transmit and receive correlated signals.

17 Claims, 5 Drawing Sheets

ADAPTIVE DIGITAL CANCELLATION USING PROBE WAVEFORMS

GOVERNMENT RIGHTS

This invention was made with Government support under Contract No. F A8702-15-D-0001 awarded by the U.S. Air Force. The Government has certain rights in the invention.

BACKGROUND

Adaptive digital filtering is used for self-interference reduction in simultaneous transmit and receiver ("STAR") systems. Conventional adaptive filter techniques make use of correlations between the received waveform and the known transmitted waveform to automatically synthesize a filter structure which matches the physical response of the system. In this way, the self-interference can be accurately modeled and removed.

Channel noise and nonlinear distortion cannot be corrected by linear adaptive filters. This limits the effectiveness of digital cancellation. If an external signal of interest ("SOP") is correlated with the transmitted waveform, then it will also be attenuated or removed by the adaptive canceller, thus rendering this technique ineffective for use in many practical systems, e.g. radars, comm. repeaters, digital radio frequency memories, etc.

Furthermore, the performance of computationally efficient filter algorithms (e.g. least mean square algorithms) depends on the characteristics of the transmitted waveform. Thus, systems that utilize many practical waveforms (e.g. narrowband comm., chirps) will converge extremely slowly. Also, multichannel cancellation (e.g. for STAR phased arrays) will have very poor convergence due to high correlation between transmit channels.

For multichannel systems, existing solutions are computationally expensive and require central processing of all data to compute cross-correlations. This scales poorly as the number of channels increases.

SUMMARY

A method and apparatus for achieving simultaneous transmit and receive ("STAR") operation with digital cancelling based upon probe waveforms is described. Digital cancelling based upon probe waveforms enables transmitting and receiving channels in STAR systems to transmit and receive correlated signals.

In accordance with one aspect of the concepts described herein a method for simultaneous transmit and receive ("STAR") operation comprises emitting, by a transmit channel, a transmit signal, wherein the transmit signal includes at least a source signal portion and a probe signal portion; coupling a portion of the transmit signal from an output of the transmit channel to an observation receive channel coupled to a same antenna element as the transmit channel; determining an estimated observed probe signal portion based upon the coupled portion of the transmit signal; generating a cancel signal based upon the estimated observed probe signal portion; receiving, via a receive path, a receive signal comprising at least a portion of a signal of interest and at least a portion of the emitted transmit signal; and combining the receive signal with the cancel signal to generate an estimate of the signal of interest.

The method may further include one or more of the following features either taken individually or in any combination: wherein the source signal portion and the portion of the signal of interest are correlated; generating, an estimate of the observation channel response based on the transmit signal and the coupled portion of the transmit signal, wherein the estimated observed probe signal portion is generated further based on the estimate of the observation channel response; wherein determining the estimated observed probe signal comprises weighting, the probe signal according to the estimate of the observation channel reference; generating a residual error signal, wherein the residual error signal comprises the difference between a weighted portion of the source signal and the estimate of the signal of interest; wherein the weighted portion of the source signal is generated according to least mean squares, recursive lease squares, or sample matrix inversion; wherein the cancel signal is further determined based upon the residual error signal.

In accordance with a further aspect of the concepts described herein, an apparatus for multichannel simultaneous transmit and receive, comprises a plurality of transmit channels, wherein each of the transmit channels comprises an observation channel estimator and an adaptive canceller; and a plurality of probes each configured to introduce a probe signal to a respective transmit channel; wherein each observation channel is configured to determine an estimated probe signal; wherein each adaptive canceller is configured to generate a cancel signal based upon the estimated probe signal.

The apparatus may further include one or more of the following features either taken individually or in any combination: wherein each transmit channel is coupled to an observation receiver configured to measure a transmit signal emitted by the respective transmit channel; wherein each observation channel is further configured to determine the estimated probe signal based upon the measured transmit signal; further comprising a residual signal canceller configured to generate a residual error signal based upon a source signal and an estimated signal of interest; wherein each cancel signal is further generated according to the residual error signal; wherein each cancel signal generated by the plurality of transmit channels is summed at a node; wherein the summed cancel signal is subtracted from a receive signal to generate an estimated signal of interest; wherein a first of the plurality of transmit channels is configured to subtract the cancel signal generated by the first transmit channel from a receive signal to generate a partial error signal; wherein a second of the plurality of transmit channels is configured to subtract the cancel signal generated by the second transmit channel from the partial error signal to generate an estimated signal of interest; wherein the plurality of transmit channels are within an antenna array.

BRIEF DESCRIPTION OF THE DRAWINGS

The concepts, structures, and techniques sought to be protected herein may be more fully understood from the following detailed description of the drawings, in which.

DETAILED DESCRIPTION

Described herein is a system and related technique for implementing simultaneous transmit and receive ("STAR"). The system utilizes observation channels, observation channel estimators, and adaptive cancellers. It should be appreciated that to promote clarity in the description of the broad concepts, systems and techniques sought to be protected, the systems and techniques have been substantially described in the context of a single transmit antenna element which operates with single signals. It is, of course, recognized that the concepts, systems and techniques may operate with a multiplicity of transmit signals which may feed a plurality of transmit channels.

Likewise, to promote clarity in the description of the broad concepts, systems and techniques sought to be protected, the systems and techniques have been substantially described in the context of a single receive antenna element coupled to a receive channel. It is also recognized that the concepts, systems and techniques may operate with a multiplicity of antennae and a multiplicity of received signals provided to a multiplicity of receive channels.

Figure 1A:
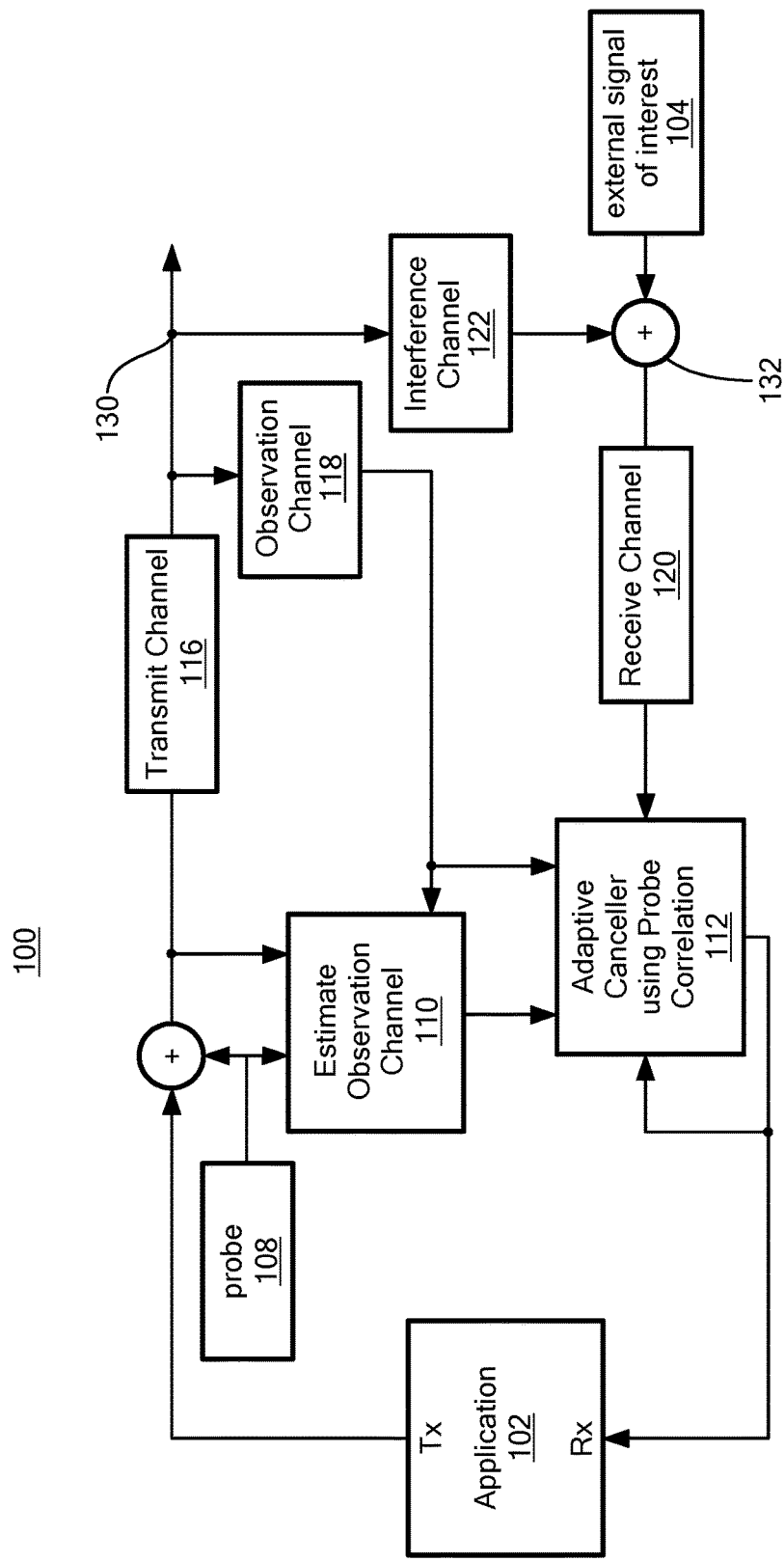
FIG. 1A is a block diagram of a simultaneous transmit and receive ("STAR") system suitable for adaptive cancellation using probe waveforms, according to an embodiment.

Referring now to FIG. 1A, a STAR system 100 suitable for adaptive cancellation through the use of probe waveforms may include at least one transmit antenna element 130 (with only a single antenna element 130 being shown in FIG. 1A for clarity). Each one of the at least one transmit antenna elements 130 is coupled to at least one corresponding transmit channel 116. Also coupled to each at least one transmit channel is at least one corresponding observation channel 118. In some embodiments, the number of transmit antenna elements 130 may equal the number transmit channels 116 and observation channels 118 while in other embodiments the number of transmit antenna elements 130 may differ from the number of transmit channels 116 and observation channels 118. In the illustrative embodiment of FIG. 1A, there is one transmit antenna element 130, coupled to one transmit channel 116 and one observation channel 118.

According to some embodiments, at least portions of each transmit channel 116 may correspond to a transmit path of a transmit/receiver (T/R) module and each observation channel 118 may comprise an observation receiver which may or may not correspond to a portion of a receive path in a T/R module. In some embodiments, a transmit channel 116 and a respective observation channel 118 coupled to a transmit antenna element 130 may be within the same T/R module, i.e. a T/R module coupled to a transmit antenna element 130 may comprise a transmit channel 116, observation channel 118, and a receive channel 120.

In other embodiments, the observation channel may be separate from the transmit and receive channels in a T/R module (i.e. the observation channel 118 may not be part of the T/R module per se).

In some embodiments, the T/R module coupled to a transmit antenna element 130 may be configured to transmit a signal as in generally known.

STAR system 100 further includes at least one receive antenna element 132. Each one of the one or more receive antenna elements 130 is coupled to at least one receive channel 120. In some embodiments, the number of receive antenna elements 132 may equal the number of receive channels 120 while in other embodiments the number of receive antenna elements 132 may differ from the number of receive channels 120. In the illustrative embodiment of FIG. 1A, there is one receive antenna element 132 coupled to one receive channel 120.

According to some embodiments, receive channel 120 may comprise a receiver or a T/R module. In some embodiments, the T/R module coupled to a receive antenna element 132 may be configured to receive a signal.

According to some embodiments, STAR system 100 may include application circuitry 102 for processing of signals (e.g. processing/generation of either or both transmit and receive signals) in accordance with the needs of a particular application. Application circuitry 102 may be configured to generate and supply a source signal to transmit channel 116.

STAR system 100 also includes at least one probe signal source 108, at least one observation channel estimator 110, and at least one adaptive canceller 112. For each transmit channel 118, there is a respective probe 108 which generates and appropriate probe signal. Each respective probe signal source 108 is configured to supply a probe signal that is added to at least a portion of source signal in order to generate a transmit signal. According to some embodiments, the probe signal is uncorrelated to the source signal.

The transmit signal is then supplied to the respective transmit channel 116 for emission through transmit antenna elements 130. For example, in the illustrative embodiment of FIG. 1A, probe signal source 108 would supply a probe signal that is added to at least a portion of a source signal (e.g. as may be generated by application circuitry 102) in order to generate a transmit signal that is then supplied to transmit channel 116 for emission through transmit antenna element 130.

Each observation channel 118 is configured to couple at least a portion of the transmit signal to be emitted through transmit antenna elements 130 to produce an observed signal. For example, in the illustrative embodiment of FIG. 1A, observe channel 118 couples a portion of a transmit signal from the transmit signal path and produces an observed signal at an output thereof. The observed signal thus includes at least a portion of the source signal and at least a portion of the probe signal. In some embodiments, the observed signal may further include distortion and noise generated by transmit channel 116 and observation channel 118.

In an embodiment, receive channels 120 may receive a portion of the emitted transmit signal concurrently—e.g. due to physical proximity of transmit and receive antenna elements. This is represented in FIG. 1A as interference channel 122. Interference channel 122 may thus encompass leakage or other noise signals between the transmit and receive paths as well as the mutual coupling between the receive antenna elements 132 and transmit antenna elements 130, so that each receive channel 120 may receive a portion of the emitted transmit signal as the transmit signal is emitted through transmit channels 116. Such mutual coupling may be a result of a variety of factors including, such as, but not limited to, proximity of transmit and receive antenna elements, power level of the transmit signal, shape and sidelobe levels and positions of transmit and receive beams. Thus, each signal received via receive antenna elements 132 includes at least a portion of a signal of interest 104 and a portion of the emitted transmit signal (coupled self-interference).

Further, for each transmit channel 116, there is a respective observation channel estimator 110. Each observation channel estimator 110 is configured to receive a portion of the transmit signal, a portion of the probe signal from the respective probe 108, and a portion of the observed signal from the observe channel 118 coupled to the same transmit antenna element 130 as the respective transmit channel 116. From these signals, observation channel estimator 110 estimates a reference response in order to estimate the probe signal portion of the observed signal as discussed in further detail below. According to some embodiments, the source signal and signal of interest may be correlated, by estimating the reference response to estimate the probe signal portion of the observed signal, only self-interference will be removed from the receive signal as discussed further below.

For example, in the illustrative embodiment of FIG. 1A, observation channel estimator 110 is configured to receive the transmit signal supplied to transmit channel 116, the probe signal from probe 108, and the observed signal from observation channel 118. Based upon at least the above-mentioned signals, observation channel estimator 110 estimates the probe signal portion of the observed signal. The observation channel estimators 110 may encompass digital signal processors (DSP) coupled to a memory (including, but not limited to, a ROM, EPROM, EEPROM, flash memory, HDD, or any combination thereof).

Each observation channel estimator 110 is further configured to supply the estimated observed probe signal portion to a respective adaptive canceller 112. Each respective adaptive canceller 112 is also configured to receive the observed signal from observation channel 118 that is supplied to the respective observation channel estimator 110. For example, in the illustrative embodiment of FIG. 1A, adaptive canceller 112 is configured to receive the estimated observed probe signal from observation channel estimator 110 and the observed signal from observation channel 118 that was also supplied to observation channel estimator 110. As will become apparent from the description herein below, based upon these signals, adaptive cancellers 112 generate a cancel signal to remove any portion of the transmit signal from a receive signal in order to estimate a signal of interest as discussed in further detail below. Adaptive cancellers 112 may encompass DSPs coupled to a memory (including, but not limited to, a ROM, EPROM, EEPROM, flash memory, HDD, or any combination thereof).

According to some embodiments, when the source signal and the signal of interest are correlated, tuning adaptive cancellers 112 based upon estimated probe signals allows only self-interference—i.e. mutual coupling—to be removed when determining the estimated signal of interest.

In some embodiments, adaptive cancellers 112 are also configured to receive signals from the receive channels. As discussed above, each receive signal includes at least a portion of a signal of interest 104 and a portion of the emitted transmit signal—and thus at least a portion of the probe signal. Adaptive cancellers 112 may combine the receive signal with the generated cancel signals to generate an estimated signal of interest. According to some embodiments, adaptive cancellers 112 may further generate the cancel signals based upon the estimated signal of interest.

Figure 1B:
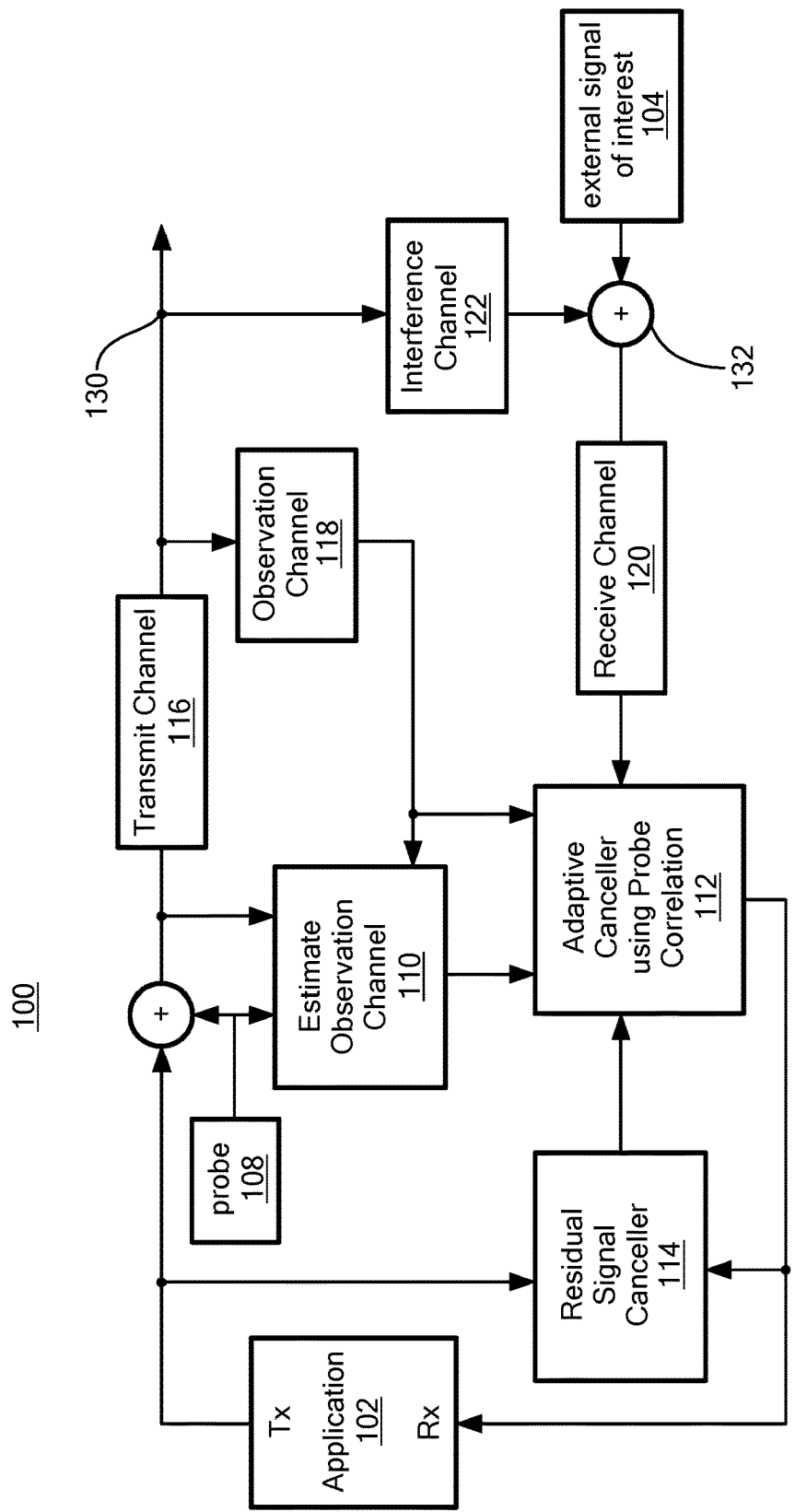
FIG. 1B is a block diagram of a STAR system suitable for adaptive cancellation using probe waveforms using a residual signal canceller, according to an embodiment.

Referring now to FIG. 1B, in which like elements of FIG. 1A are provided having like designations, in some embodiments, STAR system 100 may further include residual signal canceller 114. Residual signal canceller 114 is configured to receive the source signal and the estimated signal of interest generated from the cancel signals. Residual signal canceller 114 generates a residual error signal to remove any portion of the source signal with the estimated signal of interest as discussed in more detail further below. Residual signal canceller 114 may encompass a DSP coupled to a memory (including, but not limited to, a ROM, EPROM, EEPROM, flash memory, HDD, or any combination thereof). In some embodiments, residual signal canceller 114 may be further configured to provide the residual error signal to adaptive cancellers 112. According to some embodiments, adaptive cancellers 112 may further generate cancel signals based upon the residual error signal.

Figure 2:
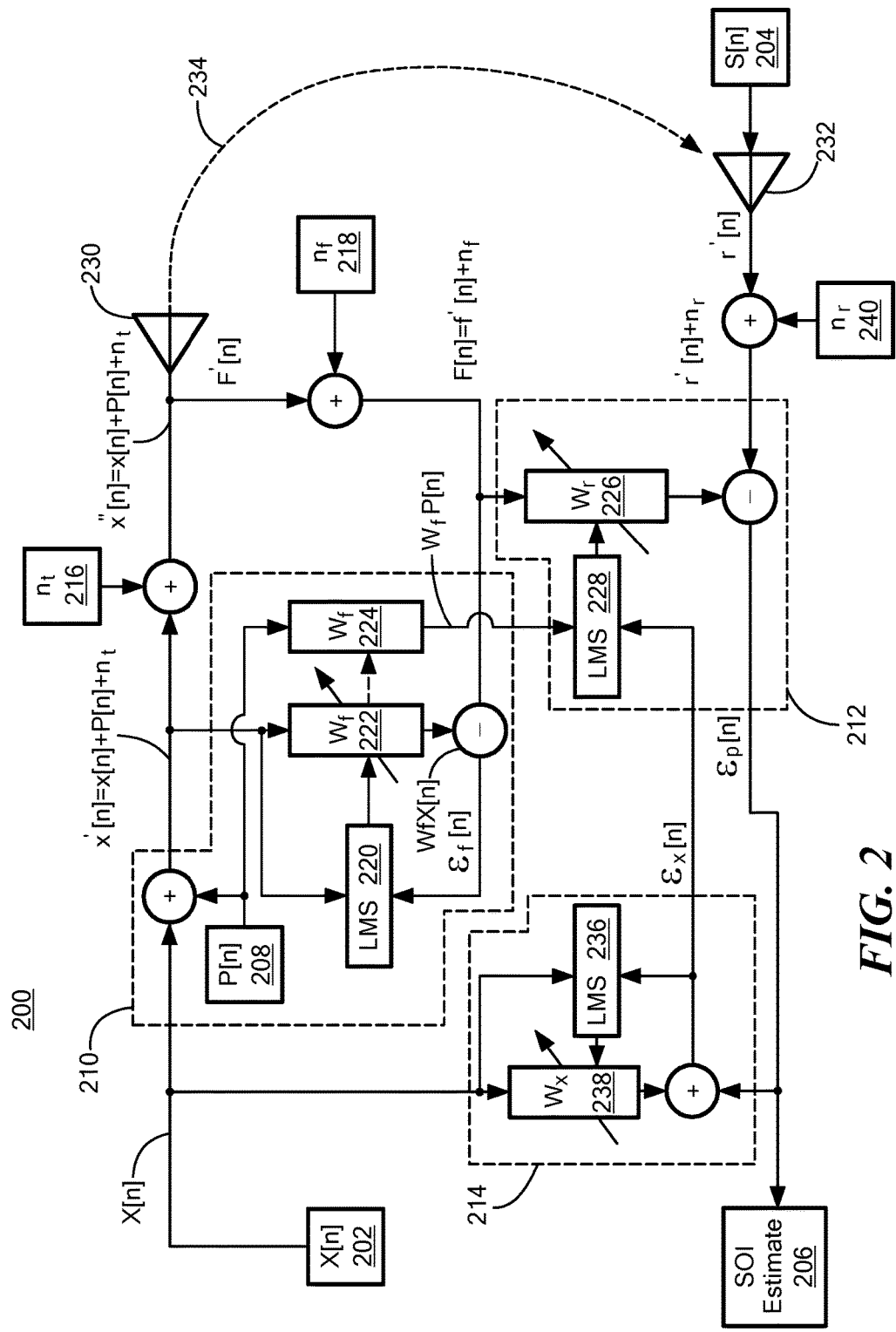
FIG. 2 is a signal path diagram of a STAR system suitable for adaptive cancellation using probe waveforms using a residual signal canceller, according to an embodiment.

Referring now to FIG. 2, a signal-flow diagram for a STAR system such as that described above in conjunction with FIGS. 1A and 1B illustrates that, in an embodiment, a source signal source 202 generates a source signal x[n] that is provided to at least one transmit channel coupled to at least one transmit antenna element 230. Transmit antenna elements 230 may, as an example, be the same as or similar to transmit antenna elements 130 described above in conjunction with FIGS. 1A and 1B. Further, a probe signal source 208 generates a probe signal p[n] that is also provided to each respective transmit channel so that the signal provided to each transmit channel may be expressed as:

$$x'[n]=x[n]+p[n] \qquad [\text{Eq. 1}]$$

Wherein x'[n] represents the transmit signal, x[n] represents the source signal, and p[n] represents the respective probe signal. The transmit signal x'[n] may also be provided to observation channel estimator 210.

Additionally, each probe signal source 208 supplies the probe signal to a respective observation channel estimator 210.

According to some embodiments, when the transmit signals are passed through each transmit channel, transmit noise (which may be expressed as nt and represented as element 216 in FIG. 2) may be introduced on each transmit channel. Transmit noise $n_t$ may comprise noise and distortion added due a variety of factors including, but not limited to, nonlinearities of transmit circuitry and power amplifiers within the transmit channels. Therefore, the transmit signal at an output of each transmit channel may be defined as:

$$x''[n]=x[n]+p[n]+n_t[n] \qquad [\text{Eq. 2}]$$

Wherein $n_t$ represents transmit noise 216.

According to an embodiment, the transmit signal passed through each transmit channel may be emitted by coupled transmit antenna element 230. Portions of the emitted transmit signals may be coupled by an observation channel coupled to an output of the transmit channel or a port of the transmit antenna element 230 from which the transmit signal was emitted to produce an observed signal f'[n]. In some embodiments, when the portions of the emitted transmit signals are measured by the observation channels, observation receive noise (express as $n_r$ and represented as element 218 in FIG. 2) may be introduced on each observation channel. Observation receive noise 218 may comprise noise and distortion added due a variety of factors including, but not limited to, nonlinearities of receive circuitry and power amplifiers within the observation channels. Therefore, the observed signal at an output of each observation channel may be defined as:

$$f[n]=f'[n]+n_r[n] \qquad [\text{Eq. 3}]$$

Wherein f[n] represents the observed signal, f'[n] represents the coupled portions of the transmit signal, and $n_f$ represents observation receive noise. The observed signal may further be passed from the observation channel to a respective observation channel estimator 210 and adaptive canceller 212.

Each observation channel estimator 210 includes an adaptive coefficient update block 220, digital filter 222, and digital filter 224. Observation channel estimator models an estimated probe signal based upon the observed signal f[n] by, for example, but not limited to, a least mean square (LMS) analysis. More specifically, digital filter 222 is configured to receive and weigh the transmit signal x'[n] according to adaptive coefficient update block 220. The weighted transmit signal wx'[n] may be subtracted from the observed signal f[n] to generate an estimate reference response. The estimate reference response encompasses an estimate of the observed probe signal portion of the observed signal. The estimate reference response may be represented as:

$$\varepsilon_f[n]=f[n]-w_f^H[n](x[n]+p[n]) \quad \text{[Eq. 4]}$$

Signal $\varepsilon_f$ represents the estimate reference response and $w_f^H[n]$ represents the weights applied to transmit signal x'[n] by digital filter 222.

According to an embodiment, adaptive coefficient update block 220 is configured to receive the transmit signal x'[n] and the estimate reference response Cf. Adaptive coefficient update block 220 may determine the weights applied to the transmit signal x'[n] by digital filter 222 in order to generate the estimated reference response by, for example, but not limited to, LMS, Recursive Least Squares ("RLS"), Sample Matrix Inversion ("SMI"), or any combination thereof—i.e. adaptive coefficient update block 220 may comprise, but is not limited to, an LMS, RLS, or SMI filter. The weights applied by digital filter 222 may be represented as:

$$w_f[n+1]=w_f[n]+2\mu_f\varepsilon_f^*[n](x[n]+p[n]) \quad \text{[Eq. 5]}$$

Wherein $\mu_f$ represents a convergence coefficient.

As the weights are determined for digital filter 222, the weights are further passed to digital filter 224. Digital filter 224 is configured to receive and weight the probe signal p[n] according to the weights determined for digital filter 222. In doing this, digital filter 224 produces an estimated probe signal. The estimated probe signal may be represented as:

$$p_f[n]=w_f^H[n]p[n] \quad \text{[Eq. 6]}$$

Wherein $p_f[n]$ represents the estimated probe signal.

Each adaptive canceller 212 may be configured to receive an estimated probe signal $p_f[n]$ from a respective estimate observation channer 210. Each adaptive canceller 212 includes a digital filter 226 and adaptive coefficient update block 228. Adaptive cancellers 212 weigh the observed signals f[n] according to the estimated probe signals $p_f[n]$ in order to generate a weighted observed signal wf[n], also known as a cancel signal, to remove portions of the probe p[n] and source signals x[n] from a receive signal r[n].

Specifically, digital filter 226 weighs the observed signal f[n] according to the adaptive coefficient update block 228 to generate a cancel signal. The cancel signal is then subtracted from the receive signal r[n] to generate and estimated signal of interest $\varepsilon_p$. The estimated signal of interest may be represented as:

$$\varepsilon_p[n]=r[n]-w_p^H[n]f[n] \quad \text{[Eq. 7]}$$

The estimated signal of interest may alternatively be represented as:

$$\varepsilon_p[n]=s[n]+n_r[n]+w_p^H n_f[n] \quad \text{[Eq. 8]}$$

Wherein $\varepsilon_p[n]$ is the estimated signal of interest, r[n] is the received signal, $n_f$ is the observation receive noise, s[n] is a signal of interest, and $w_p^H$ is the weights applied by digital filter 226.

According to some embodiments, adaptive coefficient update block 228 is configured to receive the estimated probe signal $p_f[n]$ and cancel signal. Adaptive coefficient update block 228 may determine the weights applied to observed signal f[n] by digital filter 226 to generate a cancel signal by, for example, but not limited to, LMS, RLS, SMI, or any combination thereof—i.e. adaptive coefficient update block 228 may comprise, but is not limited to, an LMS, RLS, or SMI filter. The weights applied by digital filter 226 may be represented as:

$$w_p[n+1]=w_p[n]+2\mu_p\varepsilon_x^*[n]p_f[n] \quad \text{[Eq. 9]}$$

Wherein $\mu_f$ represents a convergence coefficient.

According to some embodiments, STAR system 200 may further comprise residual signal canceller 214. Residual signal canceller 214 removes from the estimated signal of interest $\varepsilon_p$ [n] any correlated primary transmit signal x'[n]. The residual signal canceller 214, allows for a faster convergence within adaptive canceller 212 because the source signal is much higher power than the probe. Because the estimates of filter mismatch would therefore be very noisy, residual signal canceller 214 increases the speed of convergence. With residual signal canceller 214, any residual source signal, x[n], is canceled from $\varepsilon_p[n]$, resulting in the error signal $\varepsilon_x[n]$ that is dominated by the probe error alone. This error signal, $\varepsilon_x[n]$, is then fed back to adaptive canceller 212.

Residual signal canceller 214 is configured to receive the estimated signal of interest $\varepsilon_p[n]$ and the source signal x[n]. Residual signal canceller 214 includes digital filter 238 and adaptive coefficient update block 236. Digital filter 236 is configured to receive and apply weights to the source signal x[n] in order to remove any correlated source signal from the estimated signal of interest. Residual signal canceller 214 then adds the weighted source signal $w_x[n]$ to the estimated signal of interest $\varepsilon_p[n]$ in order to generate a residual error signal $\varepsilon_x[n]$. The residual error signal may be represented as:

$$\varepsilon_x[n]=\varepsilon_p[n]-w_x^H[n]x[n] \quad \text{[Eq. 10]}$$

Wherein $\varepsilon_x[n]$ is the residual error signal and $w_x^H[n]$ is the weights applied by digital filter 238.

Adaptive coefficient update block 236 is configured to receive the source signal x[n] and the residual error signal $\varepsilon_x[n]$. Adaptive coefficient update block 236 may determine the weights applied by digital filter 238 to source signal x[n] by, through for example, but not limited to, LMS, RLS, SMI, or any combination thereof—i.e. adaptive coefficient update block 236 may comprise, but is not limited to, an LMS, RLS, or SMI filter. The weights applied by digital filter 238 may be represented as:

$$w_x[n+1]=w_x[n]+2\mu_x\varepsilon_x^*[n]x[n] \quad \text{[Eq. 11]}$$

Wherein $\mu_x$ is a convergence coefficient.

Figure 3:
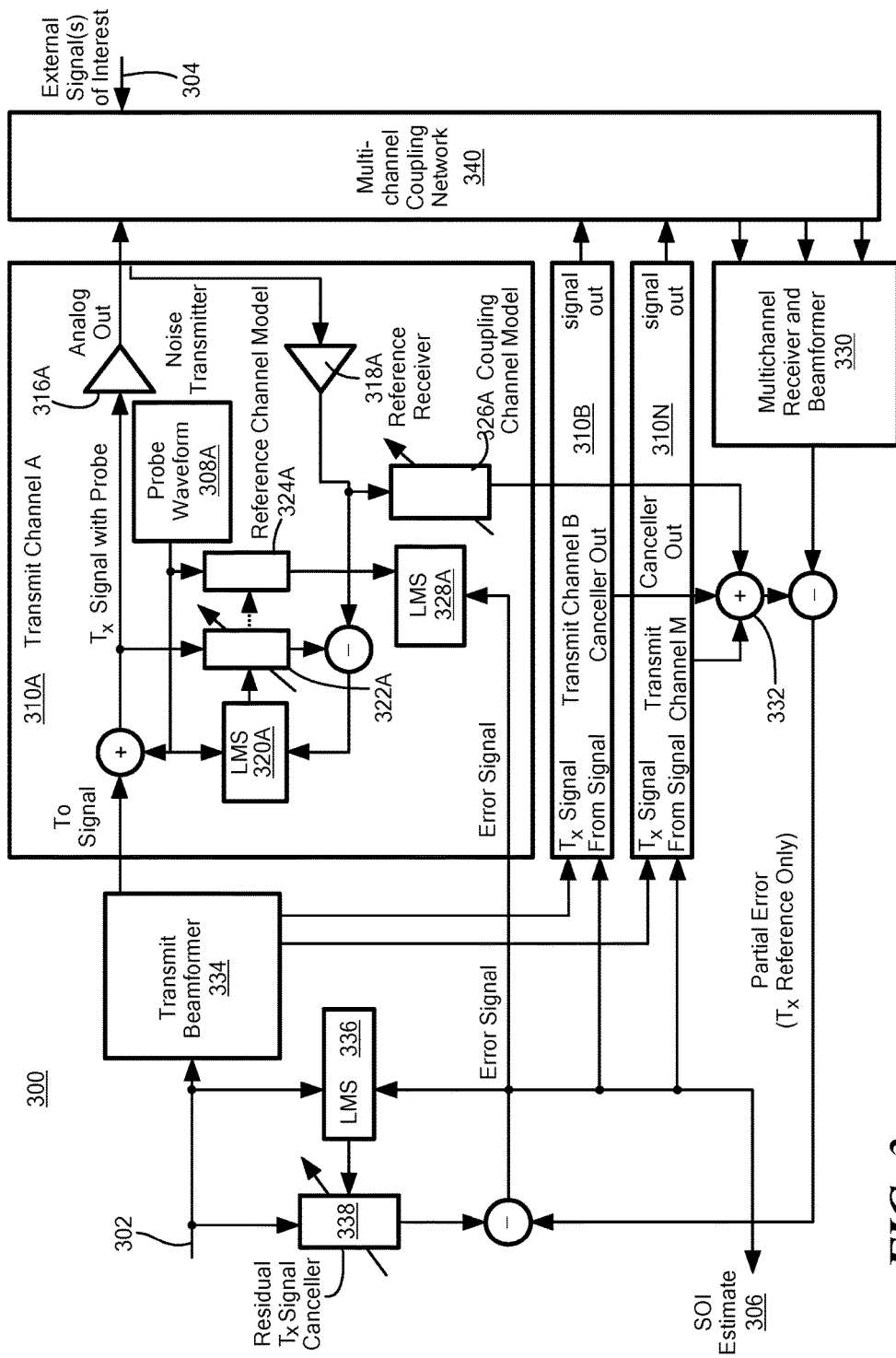
FIG. 3 is a block diagram of a multichannel STAR system suitable for adaptive cancellation using probe waveforms in a mesh configuration, according to an embodiment.

Referring now to FIG. 3, a block diagram for a STAR system 300 such as that described above in conjunction with FIGS. 1A, 1B, and 2 illustrates that, in an embodiment, a source signal source generates a source signal 302 coupled or otherwise provided to transmit channels 310. Transmit channels 310 are each coupled to at least one transmit antenna element, such as transmitters 316. Source signal 302 is coupled or otherwise provided to N transmit channels 310 via a transmit beamformer 334 having J channels. In some embodiments, the transmit beamformer 334 has a number of channels equal to the number of transmit channels 310 (i.e. J=N), however, in other embodiments the transmit beamformer 334 may have a number of channels different from the number of transmit channel 310. In the illustrative embodiment of FIG. 3, the transmit beamformer has a number of channels equal to the number of transmit channels 310.

In an embodiment, the digital transmit beamformer 334 may receive a source signal 302 from source signal source. The digital transmit beamformer 334 encompasses a digital signal processor (DSP) coupled to a memory (including, but not limited to, a ROM, EPROM, EEPROM, flash memory, HDD, or any combination thereof). The digital transmit beamformer 334 may process the signals provided thereto in accordance with known techniques to perform digital beamforming and may convert the source signal 302 into analog signals to be provided to each of the transmit channels 310. The analog source signals are provided through transmit circuitry 316 (e.g. noisy transmit circuitry) to transmit antenna elements that emit the transmit signals.

As noted above, the transmit beamformer 334 may implement multiple signals and/or multiple beams. Thus, in some embodiments, the system may include a multiplicity of source signals 302, and multiplicity of transmit beamformers 334, that are then digitally combined to feed each of the transmit channels 310.

According to an embodiment, the desired beam pattern may include spatial cancellation (deconstructive interference patterns) to reduce (and ideally minimize) the total coupled power incident at each receiver channel (i.e. via transmit signals coupled to receive channels in response to the transmit signal emitted via transmit channels 310), while maintaining desired far field pattern characteristics such as scan angle, gain, and side-lobe level. For example, the digital transmit beamformer 334 may convert source signal 302 into analog signals provided to transmit channels 310 so that when those analog are emitted via antenna elements coupled to the transmit channel 310, they form a desired radiation pattern.

Each portion of the source signal received by each transmit channel 310 may be emitted by at least one transmit antenna element coupled to the transmit channel 310.

Multichannel coupling network 340 represents, at least, signal coupling which occurs between transmit and receive antenna elements (so-called interference signals). Multichannel coupling network 340 may include an M number of receive channels each coupled to at least one receive antenna element. The multichannel coupling network 340 may encompass, but is not limited to, a plurality of transmit antenna elements, a plurality of receive antenna elements, an antenna array, a phased antenna array, or any combination thereof. Each of the receive channels within multichannel coupling network 340 may receive a portion of a signal of interest via the coupled receive antenna elements. Further, each of the receive channels may receive portions of the emitted transmit signals from the transmit channels 310. Portions of the signals emitted on the transmit channels 310 may be received by the receive channels at least in part due to mutual coupling as discussed above.

Each receive channel may pass any received signals, such as, for example, received portions of a signal of interest and portions of the emitted portions of the transmit signal, to a multichannel receive beamformer 330 having K channels. In some embodiments, the receive beamformer 330 has a number of channels equal to the number of receive channels within multichannel coupling network 340 (i.e. K=M), however, in other embodiments the receive beamformer 330 may have a number of channels different from the number of receive channels. In the illustrative embodiment of FIG. 3, the multichannel receive beamformer 330 has a number of channels equal to the number of receive channels.

The receive beamformer 330 may convert the received signals which include portions of the emitted transmit signals from the receive channels into a digital received signal. The receive beamformer 330 implements a desired nearfield and far-field radiation pattern for the reception of both signals emitted from the transmitters 316 as well as external signals incident on the array. As noted above, the receive beamformer may implement multiple beams.

According to an embodiment, the desired receive beam pattern may include spatial cancellation (deconstructive interference patterns) to reduce (and ideally minimize) the total accepted power from each transmit channel 310, while maintaining desired far field receive pattern characteristics such as scan angle, gain, and side-lobe level to optimize reception of desired external signals. Ultimately the digital receive beamformer 330 outputs a digital received signal comprised of a portion of each of the received signals from receive channels. This may, for example, be achieved through an adaptive beamforming algorithm such as Minimum Variance Distortionless Response (MVDR) or Linear Constrained Minimum Variance (LCMV).

Each transmit channel includes transmit circuitry 316, probe signal source 308, observation receiver 318, an observation channel estimator (comprising adaptive coefficient update block 320, digital filter 322, and digital filter 324), and adaptive canceller 312 (comprising adaptive coefficient update block 328 and digital filter 326). As described in discussion of FIG. 2, each transmit channel 310 adds a probe signal from a probe signal source 308 to a portion of the source signal to generate a transmit signal that is emitted by a coupled transmit antenna element, such as transmitter 316. As the transmit signal propagates through transmit circuitry 316, noise and distortion is added to the transmit signal as is generally known.

For example, probe signal source 308A would add a probe signal to the portion of a source signal received by transmit channel 310A to generate a transmit signal. Transmit channel 310 may then emit the transmit signal via transmit circuitry 316A.

Further, as discussed above in relation to FIG. 2, an observation channel measures the transmit signal emitted by the transmit channel 310 to produce an observed signal. The observation channel may encompass, for example, an observation receiver 318 coupled to the same transmit antenna element as the transmit channel 310. According to the illustrative embodiment, observation receiver 318A may measure the transmit signal emitted by transmit channel 310A.

As discussed in detail in relation to FIG. 2, each observation channel estimator may generate an estimated probe signal for a respective transmit channel 310 based upon the probe signal, observed signal, and estimated probe signal. For example, the observation channel estimator comprising adaptive coefficient update block 320A, digital filter 322A, and digital filter 324A may generate an estimated probe signal for transmit channel 310A based upon the probe signal from probe signal source 308A and the observed signal from observe receiver 318A. The estimated probe signal is generated as detailed in the discussion of FIG. 2.

Further, as discussion in detail with relation to FIG. 2, each adaptive canceller may generate a cancel signal based upon the estimated probe signal and the observed signal. For example, an adaptive canceller comprising adaptive coefficient update block 328A and digital filter 326A generate a cancel signal for transmit channel 310A according to the observed signal from observe receiver 318A and an estimated probe signal from the observation channel estimator related to transmit channel 310A.

Each cancel signal from the transmit channels 310 may then be added together and subtracted from the receive signal output by multichannel receive beamformer 330 to generate a partial error signal.

Multichannel STAR system 300 includes a residual signal canceller comprising digital filter 338 and adaptive coefficient update block 336. As described in detail with reference to FIG. 2, the residual signal canceller may generate a residual error signal to cancel any residual source signal within the receive signal. Digital filter 338 is configured to receive and weight the source signal. The weighted source signal is then subtracted from the partial error signal to generate an estimated signal of interest 306, also known as a residual error signal.

According to some embodiments, the residual error signal, or estimated signal of interest 306 is supplied to each transmit channel 310 so that each adaptive canceller within a transmit channel 310 may further generate cancel signals based upon the residual error signal, or estimated signal of interest 306. Generating the cancel signal is discussed in further detail in regards to FIG. 2.

The weights applied by digital filter 338 are generated by adaptive coefficient update block 338 based upon the source signal and the residual error signal, as discussed in detail with regards to FIG. 2.

Figure 4:
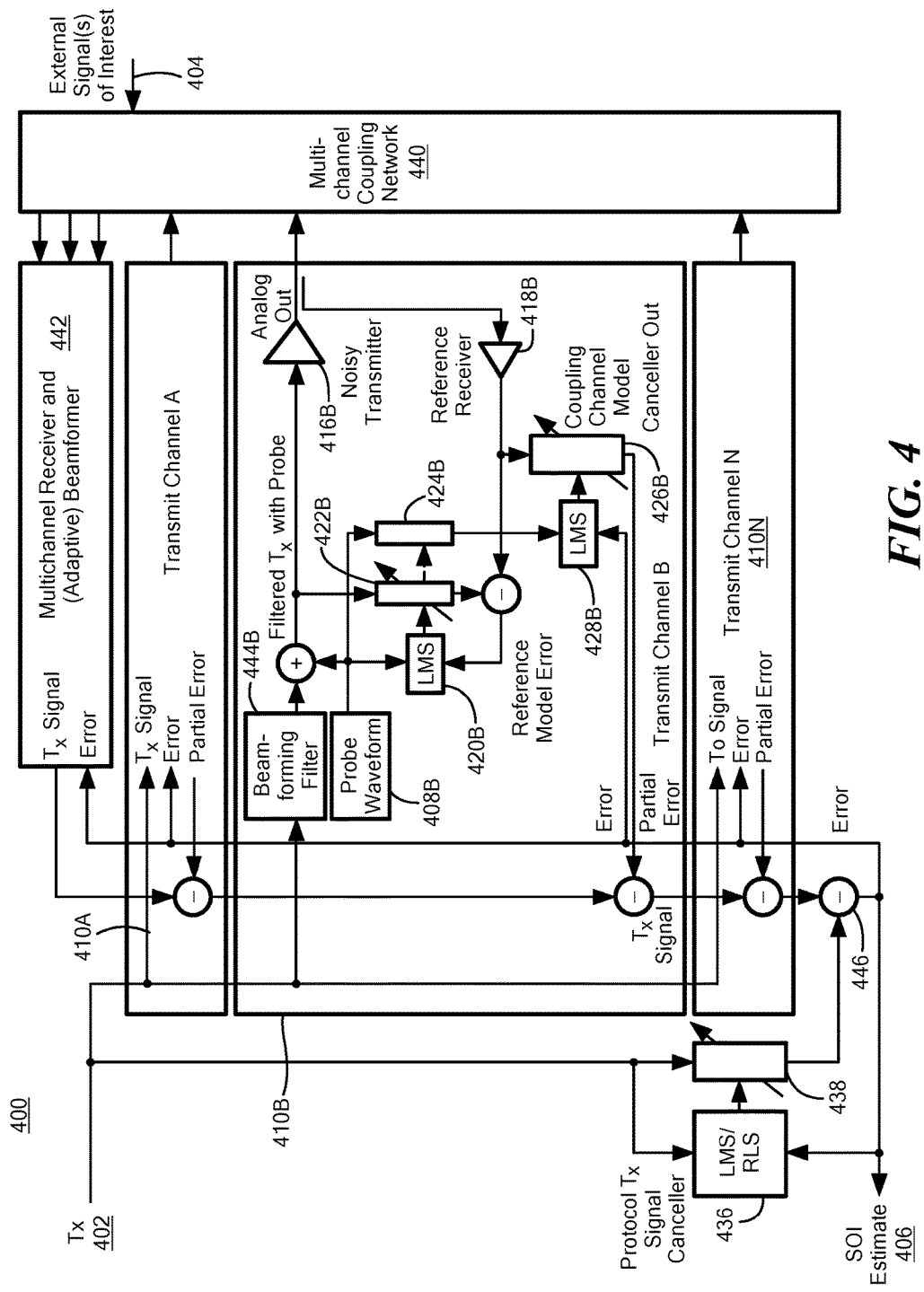
FIG. 4 is a block diagram of a multichannel STAR system suitable for adaptive cancellation using probe waveforms in a daisy chain configuration, according to an embodiment; and The drawings are not necessarily to scale, or inclusive of all elements of a system, emphasis instead generally being placed upon illustrating the concepts, structures, and techniques sought to be protected herein.

Referring now to FIG. 4, a block diagram for a STAR system such as that described above in conjunction with FIG. 3 illustrates that, in an embodiment, a multichannel STAR system 400 arranged in a daisy chain formation. As discussed in detail in regards to FIG. 3, multichannel STAR system 400 emits portions of transmit signal via transmit channels 410. Further, an M number of receive channels within the multichannel coupling network 440 receive portions of a signal of interest as well as portions of the emitted transmit signals. The signals received by multichannel coupling network 440 are passed to a multichannel receiver with K channels and a receive signal is generated. In some embodiments, the receive beamformer 430 has a number of channels equal to the number of receive channels within multichannel coupling network 440 (i.e. K=M), however, in other embodiments the receive beamformer 430 may have a number of channels different from the number of receive channels. In the illustrative embodiment of FIG. 4, the multichannel receive beamformer 430 has a number of channels equal to the number of receive channels.

In a daisy chain formation, the multichannel receive beamformer 430 may pass the receive signal to a first of the transmit channels 410. For example, in the illustrative embodiment of FIG. 4, the receive signal is passed to transmit channel A 410A.

As discussed in detail in regards to FIG. 3, each transmit channel 410 may include an observation channel estimator and adaptive canceller to generate a cancel signal. When a first of the transmit channels 410 generates a cancel signal it may be subtracted from the receive signal from receive beamformer 430 to generate a first partial error signal. The first partial error signal encompasses the receive signal less any of the transmit signal emitted by the first transmit channel 410. For example, transmit channel 410A generates a cancel signal that is subtracted from the receive signal passed from receive beamformer 440 to generate a first partial error signal.

The first partial error signal is then passed to a second transmit channel 410. The cancel signal generated by the second transmit channel 410 is subtracted from the first partial error signal to generate a second partial error signal. For example, transmit channel A 410 passes the generated first partial error signal to transmit channel B 410B. The cancel signal generated by transmit channel 410B is then subtracted from the first partial error signal to generate a second partial error signal.

The transmit channels 410 pass a received partial error signal to a subsequent transmit channel 410 until an N number of transmit channels 410 have received a partial error signal, i.e. transmit channel N receives a N-1 partial error signal from transmit channel N-1. In the illustrative embodiment of FIG. 4, a first partial error signal is passed from transmit channel A 410A to transmit channel B 410B and a second partial error signal is passed from transmit channel B 410B to transmit channel N 410N.

When the transmit channel N 410N has received a partial error signal its subtract the cancel signal generated by transmit channel N 410N from the received partial error signal to generate the error signal or estimated signal of interest 406.

By having each partial error signal generated at each transmit channel 410, less processing power may be required to compute the error signal or estimated signal of interest 406. Less processing power would be required especially in systems when there is a large number of transmit channels 410.

As discussed with reference in FIG. 3, multichannel STAR system 400 includes a residual signal canceller that generates a residual error signal based upon the source signal 402 and the estimated signal of interest 406. The residual error signal is then passed to each transmit channel 410 wherein each adaptive cancel within the transmit channels 410 generates cancel signals further based upon the residual error signal.

What is claimed is:

1. A method for simultaneous transmit and receive (STAR) operation comprising:
   emitting, by a transmit channel, a transmit signal, wherein the transmit signal includes at least a source signal portion and a probe signal portion;
   coupling a portion of the transmit signal from an output of the transmit channel to an observation receive channel coupled to a same antenna element as the transmit channel;
   determining an estimated observed probe signal portion based upon the coupled portion of the transmit signal;
   generating a cancel signal based upon the estimated observed probe signal portion;
   receiving, via a receive path, a receive signal comprising at least a portion of a signal of interest and at least a portion of the emitted transmit signal; and
   combining the receive signal with the cancel signal to generate an estimate of the signal of interest.

2. The method of claim 1, wherein the source signal portion and the portion of the signal of interest are correlated.

3. The method of claim 1, further comprising:
   generating, an estimate of the observation channel response based on the transmit signal and the coupled portion of the transmit signal;
   wherein the estimated observed probe signal portion is generated further based on the estimate of the observation channel response.

4. The method of claim 3, wherein determining the estimated observed probe signal comprises:
weighting the probe signal according to the estimate of the observation channel reference.

5. The method of claim 1, further comprising:
generating a residual error signal, wherein the residual error signal comprises the difference between a weighted portion of the source signal and the estimate of the signal of interest.

6. The method of claim 5, wherein the weighted portion of the source signal is generated according to least mean squares, recursive lease squares, or sample matrix inversion.

7. The method of claim 5, wherein the cancel signal is further determined based upon the residual error signal.

8. An apparatus for multichannel simultaneous transmit and receive, comprising:
a plurality of transmit channels, wherein each of the transmit channels comprises an observation channel estimator and an adaptive canceller; and
a plurality of probes each configured to introduce a probe signal to a respective transmit channel;
wherein each observation channel is configured to determine an estimated probe signal;
wherein each adaptive canceller is configured to generate a cancel signal based upon the estimated probe signal.

9. The apparatus of claim 8, wherein each transmit channel is coupled to an observation receiver configured to measure a transmit signal emitted by the respective transmit channel.

10. The apparatus of claim 8, wherein each observation channel is further configured to determine the estimated probe signal based upon the measured transmit signal.

11. The apparatus of claim 8, further comprising a residual signal canceller configured to generate a residual error signal based upon a source signal and an estimated signal of interest.

12. The apparatus of claim 11, wherein each cancel signal is further generated according to the residual error signal.

13. The apparatus of claim 8, wherein each cancel signal generated by the plurality of transmit channels is summed at a node.

14. The apparatus of claim 13, wherein the summed cancel signal is subtracted from a receive signal to generate an estimated signal of interest.

15. The apparatus of claim 8, wherein a first of the plurality of transmit channels is configured to subtract the cancel signal generated by the first transmit channel from a receive signal to generate a partial error signal.

16. The apparatus of claim 15, wherein a second of the plurality of transmit channels is configured to subtract the cancel signal generated by the second transmit channel from the partial error signal to generate an estimated signal of interest.

17. The apparatus of claim 8, wherein the plurality of transmit channels are within an antenna array.

* * * * *